(12) United States Patent
Gordon et al.

(10) Patent No.: US 6,732,370 B1
(45) Date of Patent: *May 4, 2004

(54) SERVICE PROVIDER SIDE INTERACTIVE PROGRAM GUIDE ENCODER

(75) Inventors: Donald F. Gordon, Los Altos, CA (US); Sadik Bayrakeri, Foster City, CA (US); Joseph R. Wild, Santa Clara, CA (US); Jeremy S. Edmonds, Castro Valley, CA (US); Edward A. Ludvig, Redwood City, CA (US); John P. Comito, Redwood City, CA (US); Eugene Gershtein, Redwood Shores, CA (US)

(73) Assignee: Diva Systems Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,330

(22) Filed: Nov. 1, 1999

(Under 37 CFR 1.47)

Related U.S. Application Data

(63) Continuation-in-part of application No. 09/201,528, filed on Nov. 30, 1998, and a continuation-in-part of application No. 09/359,561, filed on Jul. 22, 1999, which is a continuation-in-part of application No. 09/293,526, filed on Apr. 15, 1999.

(51) Int. Cl.[7] .......................... H04N 5/445; H04N 5/272
(52) U.S. Cl. .......................... 725/39; 725/40; 725/50; 725/54; 348/584; 348/586
(58) Field of Search .......................... 725/39, 40, 50, 725/54; 348/584, 586, 589, 600

(56) References Cited

U.S. PATENT DOCUMENTS

| | | | | |
|---|---|---|---|---|
| 5,422,674 A | * | 6/1995 | Hooper et al. | 375/240.15 |
| 5,635,978 A | * | 6/1997 | Alten et al. | 725/42 |
| 5,801,753 A | * | 9/1998 | Eyer et al. | 725/50 |
| 5,926,230 A | * | 7/1999 | Niijima et al. | 725/56 |
| 6,005,562 A | * | 12/1999 | Shiga et al. | 345/721 |
| 6,147,714 A | * | 11/2000 | Terasawa et al. | 348/564 |
| 6,177,930 B1 | * | 1/2001 | Chernock et al. | 345/716 |
| 6,230,324 B1 | * | 5/2001 | Tomita et al. | 725/51 |
| 6,426,779 B1 | * | 7/2002 | Noguchi et al. | 348/569 |
| 6,453,471 B1 | * | 9/2002 | Klosterman | 725/41 |
| 6,460,181 B1 | * | 10/2002 | Donnelly | 725/50 |
| 6,515,680 B1 | * | 2/2003 | Hendricks et al. | 345/716 |
| 6,518,986 B1 | * | 2/2003 | Mugura | 345/810 |
| 6,519,009 B1 | * | 2/2003 | Hanaya et al. | 348/564 |

* cited by examiner

*Primary Examiner*—John Miller
*Assistant Examiner*—Annan Q. Shang
(74) *Attorney, Agent, or Firm*—Moser, Patterson & Sheridan, LLP

(57) ABSTRACT

A method and apparatus for combining video frame sequences with a video display of an interactive program guide (IPG). The apparatus comprises a plurality of compositors that combine background information, video frame sequences and program guide graphics into a single video frame sequence. The sequence is then digitally encoded to form an MPEG-like bitstream. The same background information and informational video is composited with a different program guide graphic to form another video sequence that is also encoded. A plurality of such sequences are produced with each sequence having a different program guide graphic. Each sequence is encoded and then multiplexed into a transport stream such that all the encoded sequences are transmitted to a subscriber's terminal using a single transport stream. As such, the subscriber can transition from one program guide to the next without interruption of the background or video display as the program guide graphic is changed.

16 Claims, 7 Drawing Sheets

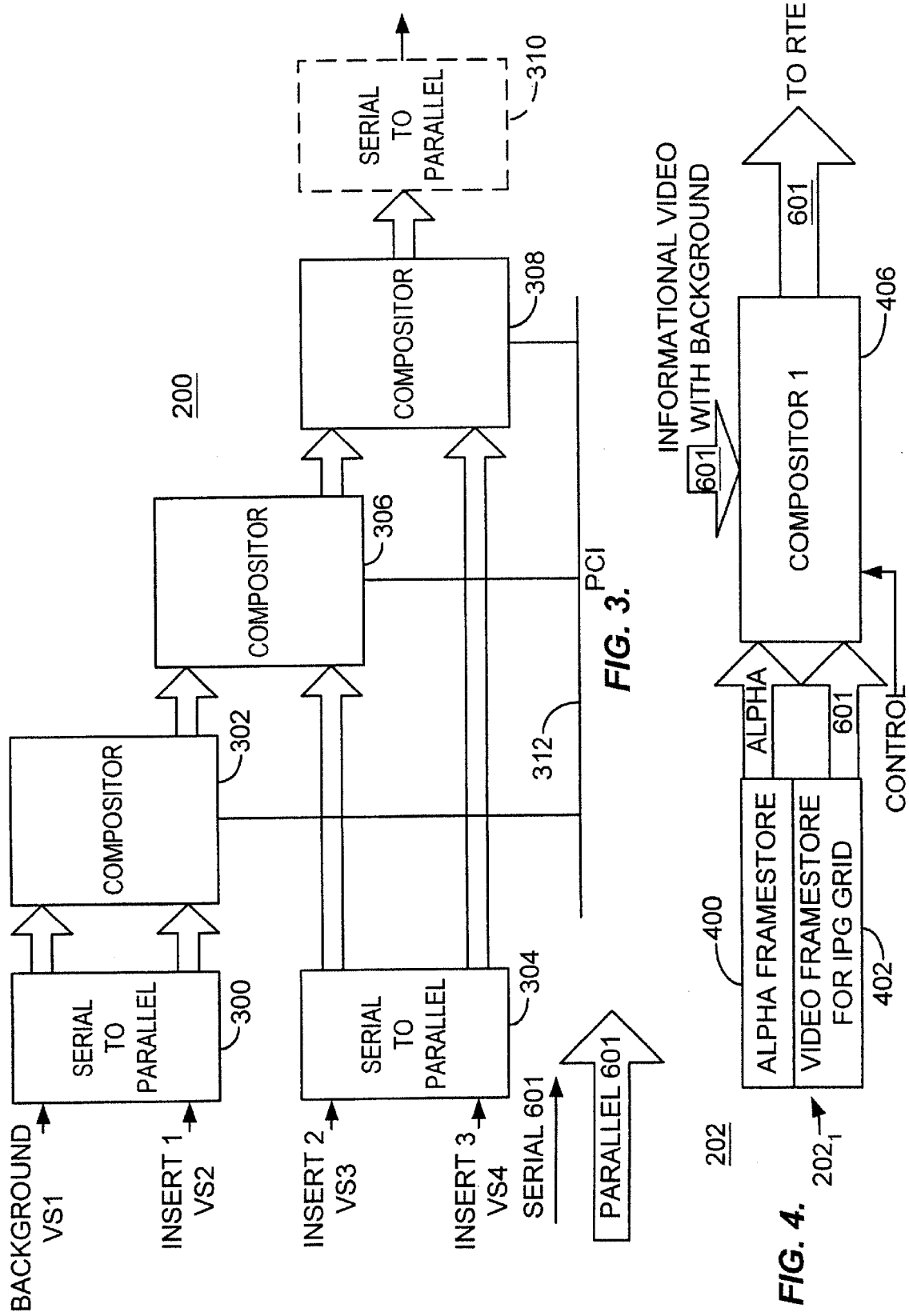

SERVICE PROVIDER SIDE INTERACTIVE PROGRAM GUIDE ENCODER

CROSS-REFERENCES TO RELATED APPLICATIONS

This application is a continuation-in-part of commonly assigned U.S. patent application Ser. No. 09/201,528, filed Nov. 30, 1998, entitled "Method and Apparatus for Combining Video Sequences with an Interactive Program Guide," which is hereby incorporated by reference in its entirety. This application is also a continuation-in-part of commonly assigned U.S. patent application Ser. No. 09/359,561, filed Jul. 22, 1999 entitled "Method and Apparatus for Encoding a User Interface," which is a continuation-in-part of application Ser. No. 09/293,526, filed Apr. 15, 1999, which is hereby incorporated herein by reference in its entirety.

BACKGROUND OF THE INVENTION

1. Field of the Invention

The invention relates to electronic program guides and, more particularly, the invention relates to a technique for encoding a user interface of an information distribution system.

2. Description of the Background Art

In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Over the past few years, television has seen a transformation in a variety of means by which its programming is distributed to consumers. Cable television systems are doubling or even tripling system bandwidth with the migration to hybrid fiber coax (HFC) cable plant thereby offering a larger number of channels to the viewer. Customers unsatisfied with their local cable systems have switched in high numbers to direct broadcast satellite (DBS) systems. And, a variety of other approaches have been attempted focusing primarily on high bandwidth digital technologies, intelligent two way set top boxes, or other methods of trying to offer service differentiated from standard cable and over the air broadcast systems.

With this increase in bandwidth, the number of programming choices has also increased. Leveraging off the availability of more intelligent set top boxes, several companies such as Starsight and Prevue Guide have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a lot of memory, some of them needing upwards of one megabyte of set top terminal (STT) memory. They are very slow to acquire their current database when they are activated for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video-on-demand (VOD) system, limited scheduling flexibility for the information provider. The user interface to existing program guides does not usually look like a typical television control interface; rather looks like a 1980's style computer display (i.e., blocky, ill-formed text and/or graphics).

Additionally, the present program guides may provide an advertising or preview region along with the program guide graphics. However, the insertion of these additional video signals is performed using an analog compositor that merely inserts (overlays) the additional imagery into the broadcast stream. The analog compositing process is accomplished and then the new analog video containing an advertisement or preview and the program guide are recorded on tape for subsequent broadcast. This compositing process is not accomplished in real time at the head end of the cable system and, consequently, the program guide can not contain targeted advertising for a particular household or a particular neighborhood or region. The program guide with its associated preview or advertising is broadcast to all subscribers connected to the head end of the cable system. Additionally, these program guides are generally passive, in that, the viewer sees the program guide information change on the screen to indicate different programs and their associated channels. However, there is no provision enabling a viewer to interact with the program guide display to scroll through the channel or channels that are available. Because such scrolling in an analog system requires a splice to a new program guide video sequence, the program guides that are interactive do not include advertising video or other video information with the program guide.

Therefore, it is desirable to provide a method and apparatus for encoding an interactive program guide.

SUMMARY OF THE INVENTION

The disadvantages associated with the prior art are overcome by the present invention of a method and apparatus for encoding user interface of an information distribution system. One embodiment of such user interface is an interactive program guide (IPG) that forms an IPG screen or page containing a graphical guide region and a video region playing at least one video sequence. The invention is a method and apparatus for performing ensemble encoding of one or more IPG pages. The invention comprises a plurality of compositors that combine background information, informational video and program guide graphics into a single sequence of video frames. The sequence is then digitally encoded to form an MPEG-like bitstream. The same background information and informational video is composited with a different program guide graphic to form another video sequence that is also encoded. A plurality of such bitstreams are produced with each sequence containing a different program guide graphic. The encoding is performed using a common coding profile and a common clock for each of the encoders. The encoded sequences are then multiplexed into at least one transport stream such that all the encoded sequences are transmitted to subscriber equipment using one or more transport streams. As such, the subscriber can transition from one program guide page to the next without interruption of the background or informational video as the program guide page graphic is changed.

The informational video may appear in multiple locations upon the IPG screen. Promotional or advertising video may appear in one portion while an animated graphic appears in another location. Each of the informational video streams may have a different rate of display. The encoders handle different video rates by using slice based encoding of the composite image sequence.

One example of a program guide that is encoded in accordance with the invention has each graphic containing a set of programs (e.g., channels) listed along a left, vertical axis and each program associated with the channel is identified in a rectangular cell that extends toward the right. The horizontal axis represents time and about 1.5 hour of programming for ten channels is shown in each program guide graphic page. The informational video is generally contained in one or more regions above the program graphic.

In another example of a program guide that is encoded in accordance with the invention has each graphic containing a set of programs (e.g., channels) listed along a left, vertical axis and each program associated with the channel is identified in a cell that is listed beneath a time axis. The horizontal axis represents time and about 1.5 hours of programming for eight channels is shown in each program guide graphic page. Each channel is associated with text that represents three programming slots, one for each half hour in the time axis. The informational video is generally contained in one or more regions next to the program graphic, i.e., a guide region is on the left half of the screen and the video region is on the right half of the screen or vice versa.

BRIEF DESCRIPTION OF THE DRAWINGS

The teachings of the present invention can be readily understood by considering the following detailed description in conjunction with the accompanying drawings, in which:

FIG. 3 depicts a block diagram of a compositor unit that produces background/informational frame sequence in accordance with the present invention;

FIG. 4 depicts a block diagram of an IPG compositor that inserts an IPG graphic into the background/informational frame sequence;

To facilitate understanding, identical reference numerals have been used, where possible, to designate identical elements that are common to the figures.

DESCRIPTION OF THE SPECIFIC EMBODIMENTS

Figure 1:
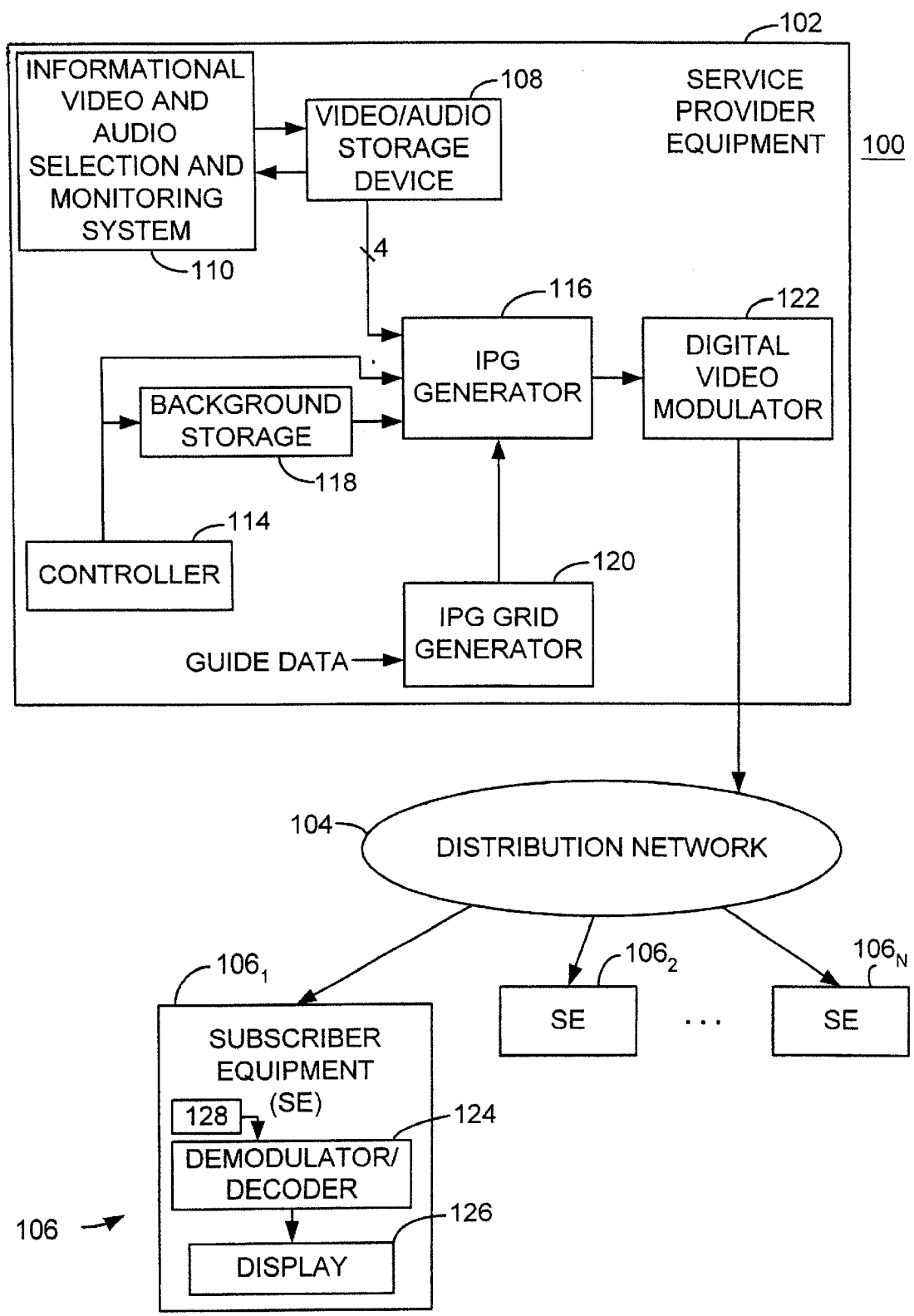
FIG. 1 depicts a high-level block diagram of an information distribution system that uses the interactive program guide of the present invention.

FIG. 1 depicts a high-level block diagram of an information distribution system 100, e.g., a video-on-demand system or digital cable system, that incorporates the present invention. The system 100 contains service provider equipment (SPE) 102 (e.g., a head end), a distribution network 104 (e.g., hybrid fiber-coax network) and subscriber equipment (SE) 106. This form of information distribution system is disclosed in commonly assigned U.S. Pat. No. 6,253,375, issued Jun. 26, 2001. The system is known as the OnSet™ system provided by DIVA Systems Corporation of Menlo Park, Calif.

In general, the SPE 102 produces a plurality of digital bitstreams that contain encoded information (e.g., television programming in an MPEG-like compressed form) These bitstreams are modulated using a modulation format that is compatible with the distribution network 104. The subscriber equipment 106, at each subscriber location $106_1$, $1062_2$, and $106_n$, comprises a decoder 124 and a display 126. Upon receiving a bitstream, the subscriber equipment decoder 124 extracts the information from the received signal and decodes the stream to produce the information on the display, i.e., produce a television program or program guide page.

In an interactive information distribution system such as the one described in commonly assigned U.S. Pat. No. 6,253,375, the program bitstreams are addressed to particular subscriber equipment locations that requested the information through an interactive menu. An appropriate interactive menu structure for requesting video on demand is disclosed in commonly assigned U.S. Pat. No. 6,208,335, issued Mar. 27, 2001.

To assist a subscriber (or other viewer) in selecting programming, the SPE 102 produces a interactive program guide (IPG) in accordance with the present invention. The IPG of the present invention contains program information, e.g., title, time, channel, program duration and the like, as well at least one region displaying full motion video, i.e., a television advertisement or promotion. Such informational video is provided in various locations within the program guide screen.

Figure 5A:
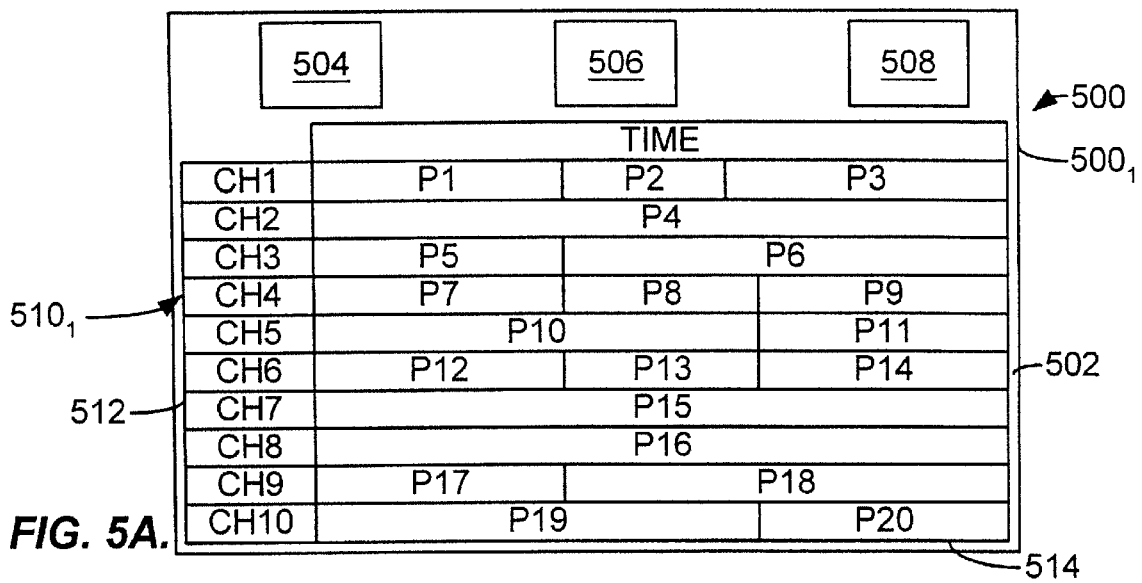
FIGS. 5A–5C depicts a series of illustrative IPG pages.

FIG. 5A illustrates a first example of an IPG 500 that is produced in accordance with the present invention. The IPG 500 contains a background 502, a plurality of video display regions 504, 506, and 508, and a program guide graphic 510. The program guide graphic 510 contains a left (or right), vertical axis 512 representing the available channels and a bottom (or top), horizontal axis 514 represents time. Generally, about 1.5 to 2 hours of programming are displayed in the guide graphic 510. Each program (e.g., P1, P2, P3, and so on) is identified by a program title within a rectangular cell. The extent of the cell (its length) indicates the duration of the program and the starting location of the left edge of the cell indicates the starting time of the program. The arrangement of the program identification cells in this manner is a conventional arrangement in which programming guides have been organized in print for years.

Returning to FIG. 1, the invention produces the IPG (500 of FIG. 5A) using a novel compositing technique that enables full motion video to be positioned within an IPG and have the video seamlessly transition from one IPG page to another. FIG. 1 depicts the components that are necessary to produce an IPG page that contains at least one video region. The embodiment of the invention is described as having advertising displayed in the video region or regions. However, advertising is merely illustrative of a type of informational video and any sequence of video or graphic information can be displayed in these regions. To this end, the SPE 102 contains a video storage device 108, an informational video selection and monitoring system 110, an IPG generator 116 (an ensemble encoder), a background storage device 118, a controller 114, an IPG grid generator 120, and a digital video modulator 122. The video selection and monitoring system 110 controls timing of the informational video display and, if the video is an advertisement, tracks video utilization to facilitate billing to an advertiser whenever a particular advertisement is transmitted. Thus, the video selection and monitoring system 110 requests that the storage device 108 (e.g., a disk drive or magneto-optical drive) recall and send to the IPG generator 116 a particular video sequence. The video is stored in the storage device 108 as frame-based digital video (i.e., 601 format video) and associated audio. Alternatively, compressed or uncompressed analog video as well as other formats of video information may be stored in the storage device 108. These formats are converted to 601 format prior to sending the video to the IPG generator 116.

As the video is recalled from device 108, each video sequence is coupled to the IPG generator 116. As such, three video streams and one audio stream (e.g., an audio stream associated with one of the advertisements) are provided to the IPG generator 116. Additionally, a background image is recalled from the storage device 118 under instructions from the controller 114. The background image is generally a static graphic, but it may be a video frame sequence containing moving imagery. Lastly, the IPG grid generator 120 provides a program guide graphic to the IPG generator 116. The IPG data for the graphic can be provided from any one of a number of sources such as a network cable feed, an internet site, a satellite feed, and the like. The guide program data is formatted, for example, into the rectangular grid graphic of program cells (screen 500 of FIG. 5A) by the IPG grid generator 120. As shall be discussed below with respect to FIG. 6, other IPG page layouts may be used and are considered to be within the scope of this invention.

Figure 6:
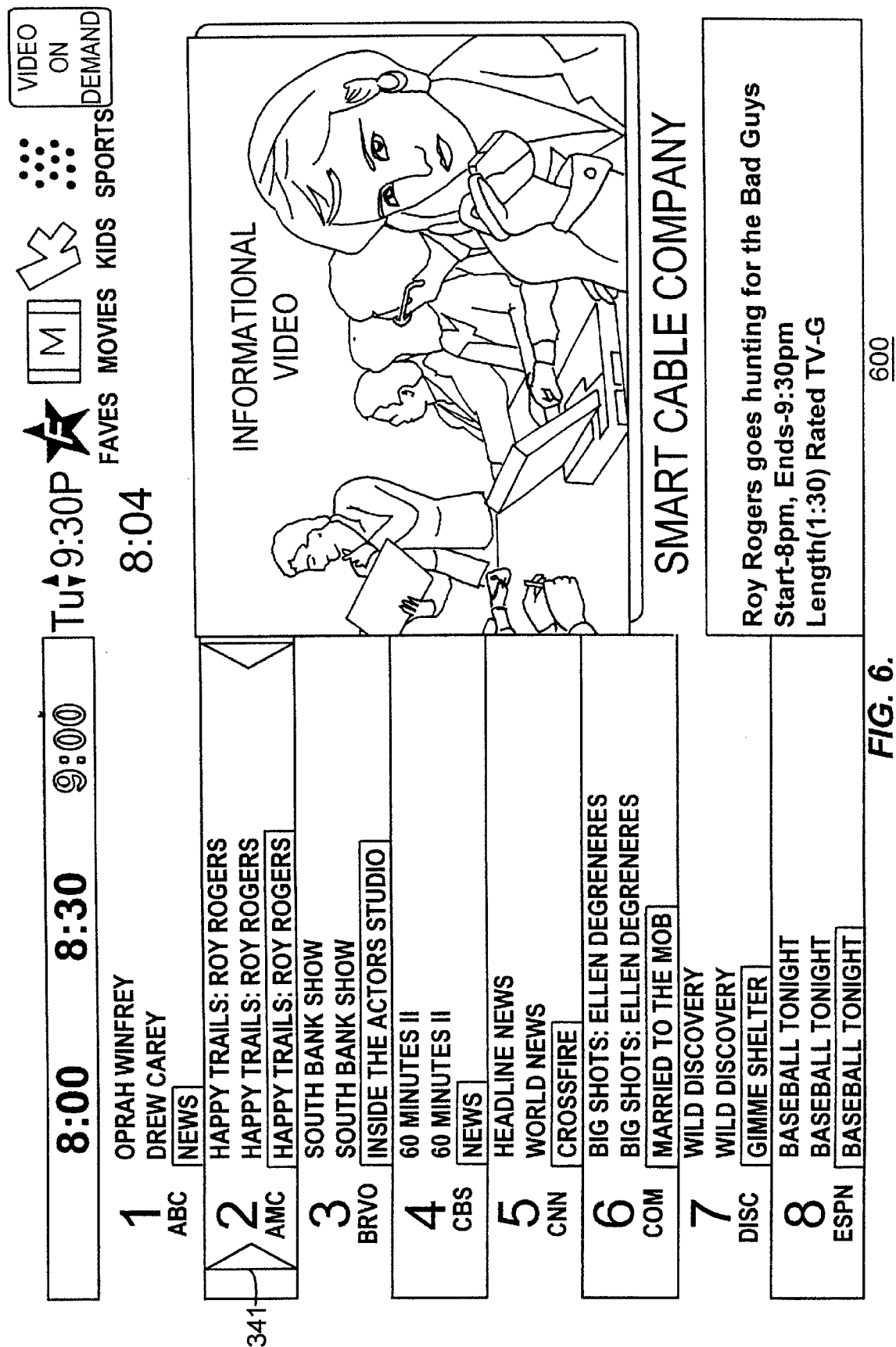
FIG. 6 depicts another example of an IPG page that can be produced by the invention.

The IPG generator 116 performs ensemble encoding by combining the three video sequences, the background and the guide graphics into a comprehensive IPG display such as the one depicted as IPG page 500 in FIG. 5A or IPG page 600 in FIG. 6. As shall be described in detail below, the informational video is overlaid onto the background to form a background/video composite and then various IPG grids are overlaid upon the background/video composite. In this manner, a number of IPG "pages", for example, fifteen of them, are produced, where each page depicts ten channels of programming information. Each of these IPG pages is encoded within the IPG generator 116 into a compressed digital bitstream, e.g., an MPEG compliant bitstream. The bitstream is then modulated by the digital video modulator 122 using a modulation format that is compatible with the distribution network 104. For example, in the OnSet™ system the modulation is quadrature amplitude modulation (QAM); however, other modulation formats could be used.

The subscriber equiament 106 contains demoludador/decoder 124 and a display 126 (e,g., a television). The demoludator 124 demodulates the signals carried by the distribution network 104 and decodes the demodulated signals to extract the IPG pages from the bitstream. As shall be described below, each of the IPG pages is indefined with a unique program identification code (known as a PID) that is used by the demoludador/decoder 124 to select a bitstream for decoding. The decoded IPG page is displayed, as shown in FIG. 5A, to the subscriber or viewer. As the viewer selects another IPG page containing other program information, generally by scrolling to the bottom of the IPG graphic 510 using a remote control interface 128 or some other input device, the IPG page stream associated with the next PID is decoded. The only change the viewer sees is the IPG graphic changes (from, for example, graphic $510_1$ to $510_2$), the informational video and its associated audio seamlessly continues playing. This seemless play occurs because each of the IPG pages contains the same, frame synchronized background and informational video and only the IPG graphic changes from page to page. As such, the decoder seeamlessly transitions from one IPG page to another.

Figure 2:
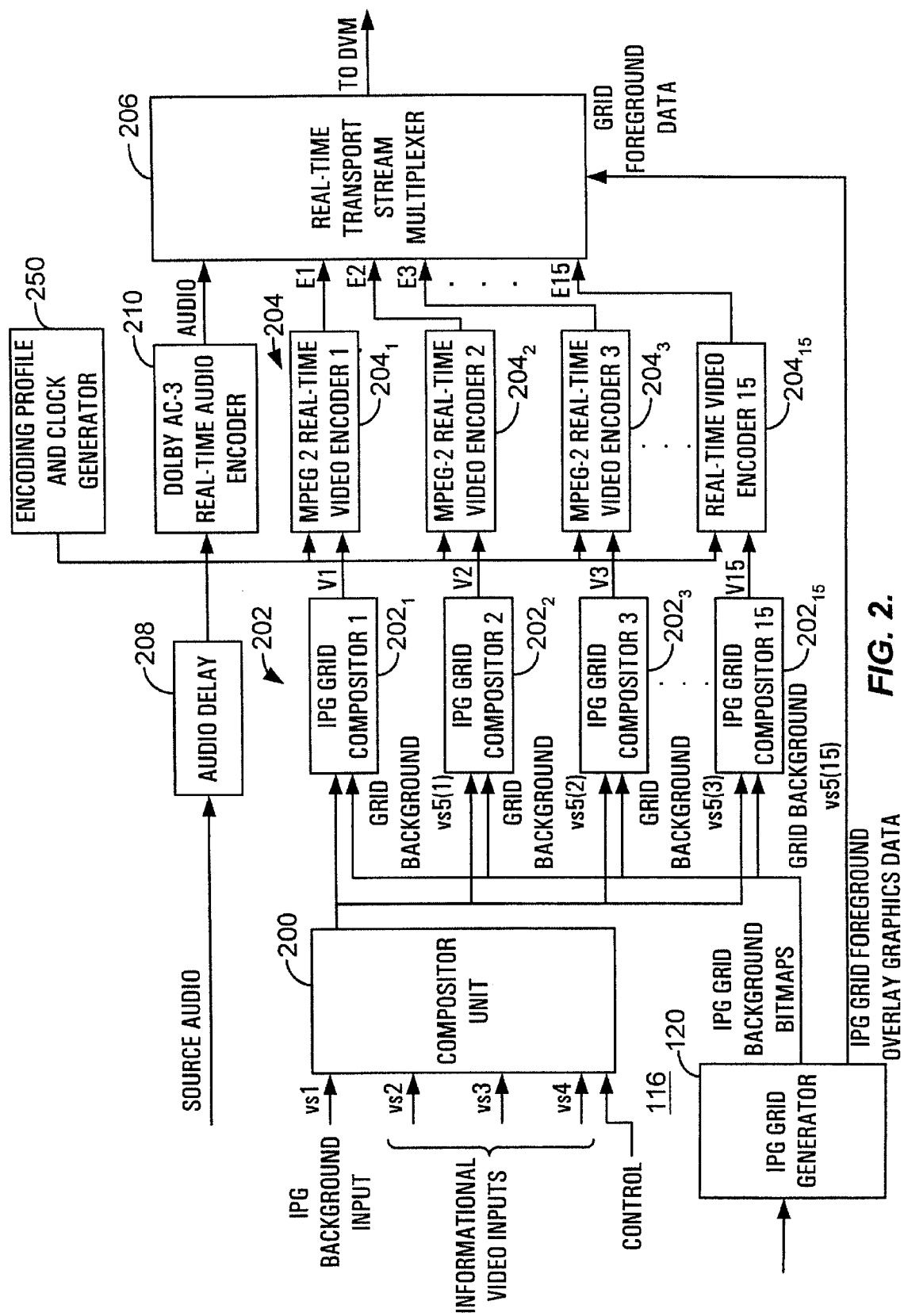
FIG. 2 depicts a block diagram of an IPG generator of the present invention.

FIG. 2 depicts a block diagram of the IPG generator 116. The IPG generator 116 contains a compositor unit 200, a plurality of IPG grid compositors 202, a plurality of video encoders 204 (e.g., MPEG-2 compliant encoders), a common profile and clock generator 250, a transport stream multiplexer 206, an audio delay 208, an audio encoder 210 (e.g., an Dolby AC-3 audio encoder) and the IPG grid generator 120. The compositor unit 200 positions the informational video sequences (vs2, vs3, vs4) upon the background video imagery (vs1). To facilitate positioning, the controller (114 in FIG. 1) provides the compositor unit 200 with the coordinates of one corner of each informational video and provides a size indicator for each rectangular region in which the video will be displayed relative to the background. The compositor unit 200 performs the placement and fusing of the imagery to form background/information video frame sequence. Further detail of this compositing process is provided below with respect to FIG. 3.

Figure 5B:
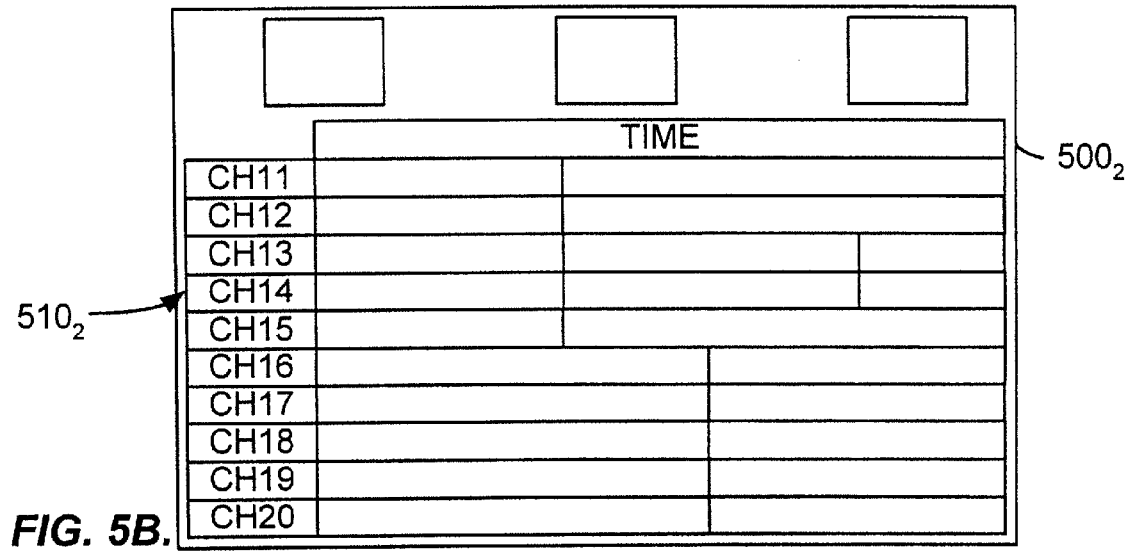
Figure 5C:
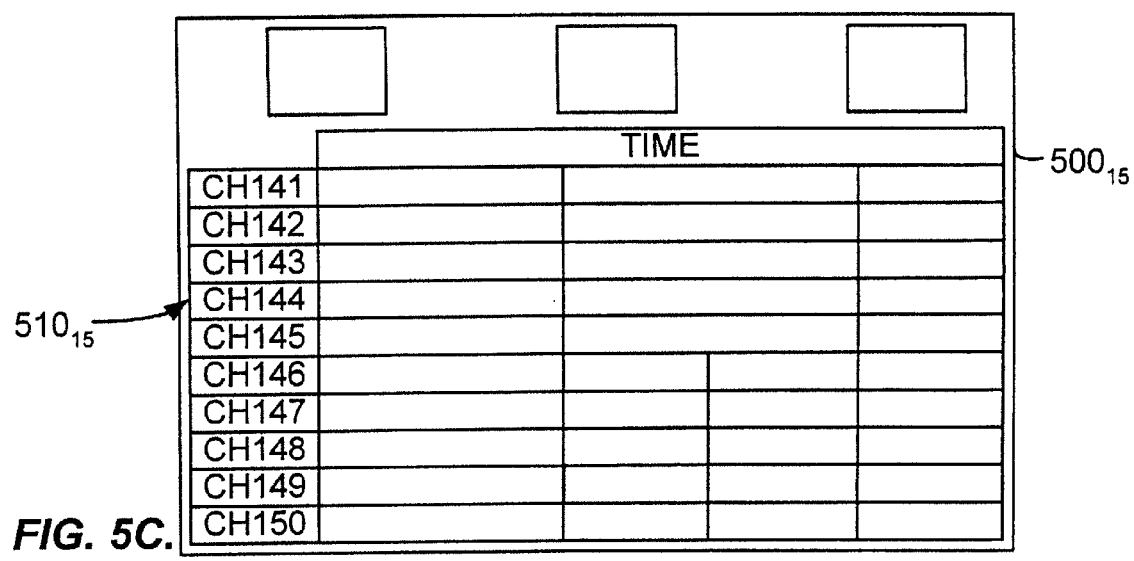

The composite image (e.g., three, full motion video frame sequences positioned upon a background image, the background/advertisement video) is coupled to a plurality of IPG grid compositors $202_1$, through $202_{15}$ (collectively referred to as compositors 202). The compositors 202 combine the respective IPG graphics with the background/informational video combination to produce a plurality of video frame sequences containing a composite of the background, the informational video, and the IPG graphics. There is one frame sequence for each IPG graphic, e.g., fifteen sequences in all. As discussed previously, the IPG graphic is produced by the IPG grid generator 120. The IPG grid generator 120 actually produces two items, one is the IPG grid background image (the IPG grid graphic discussed above and shown as graphic 510 in FIG. 5A), and IPG grid foreground overlay graphic data that is used to generate highlighting and other special effects in the displayed IPG screen. Additionally, this data attributes functionality to the highlighted elements such as selecting another IPG page, selecting a program to view, exiting the system, and the like. These special effects and functionality are discussed below with respect to FIGS. 5A, 5B and 5C.

Each of the frame sequences (IPG screen sequences V1 through V15) are coupled from the compositors 202 to the plurality of video encoders, e.g., real time MPEG-2 encoders $402_1$, through $402_n$ (collectively encoders 204). Each encoder 204 encodes an IPG screen sequence to form a compressed video bitstream, e.g., an MPEG-2 compliant bitstream. The encoders use a common encoding profile and common clock supplied by the encoding profile and dock generator 250. As such, each sequence of IPG frames are synchronously encoded in the same manner.

The IPG grid foreground overlay graphics data is also coupled to the multiplexer 206 from the IPG grid generator 120. This graphics data is generally sent as "user data" or "private data" within the transport stream. Further discussion of the graphics data is provided below.

If the informational video in each IPG page have differing amounts of motion, the encoders can encode the video in a slice-based manner. As such, each frame is divided into a plurality of horizontal stripes of macroblocks. Each frame contains stripe start and stop identifiers. The information (pixels and/or macroblocks) between the start and stop indentifiers can be encoded in a different manner than other portions of a given stripe. Consequently, a two dimensional region comprising portions of adjacent stripes can be encoded differently from other portions of the frame. The encoded information from the two dimensional region forms a bitstream that is identified by its own program identifier. At the subscriber equipment, the demodulator/decoder decodes the information in each slice, then reassembles the frame by placing the decoded slices into appropriate locations as identified by the slice start/stop identifiers. The two dimensional regions can be specified to align with the informational video such that the regions can contain video having different motion, i.e., fast versus slow motion. Consequently, one region could contain a slow moving animated character while another region could contain a fast moving sporting event promotion and both regions would be coded and decoded accurately.

All the compressed video streams (E1, E2, E3, . . . , E15) containing program guide information are multiplexed into a transport stream using multiplexer 206. These compressed video streams may contain the stripe-based encoded streams as well. In addition to the video information, audio information associated with one of the informational videos is also encoded and supplied to the multiplexer 206. The audio signal is delayed in audio delay 208, then encoded in the audio encoder 210. The delay compensates for the time required to perform video encoding of the associated video vis-a-vis the audio encoding. The compressed audio data is coupled to the multiplexer 206 for incorporation into the transport stream.

A transport stream, as defined in ISO standard 13818-1 (commonly known as the MPEG-2 Systems specification), is a sequence of equal sized packets, each 188 bytes in length. Each packet has a 4-byte header and 184 bytes of data. The header contains a number of fields, including packet identification number (PID). The PID field contains 13 bits and uniquely identifies each packet that contains a portion of a "stream" of video information as well as audio information and data. As such, to decode a particular video bitstream (or audio bitstream or data) for viewing, the decoder in the subscriber equipment extracts packets containing a particular PID and decodes those packets to create the video (and audio) for viewing.

Each of the fifteen bitstreams representing the IPG page sequences within a particular transport stream is uniquely identified by a PID. In the preferred embodiment, fifteen PID's are multiplexed into a single transport stream. Certainly, less or more IPG bitstreams can be included in a transport stream as bandwidth permits. Additionally, more than one transport stream can be used to transmit the IPG bitstreams. For example, additional IPG pages may be encoded that represent additional time within a day or additional channels. The bitstreams representing the additional IPG pages are transmitted in additional transport streams. As such, many IPG pages representing 24 hours of programming on hundreds of channels can be broadcast to the subscriber equipment for selective display to a viewer.

Figure 7:
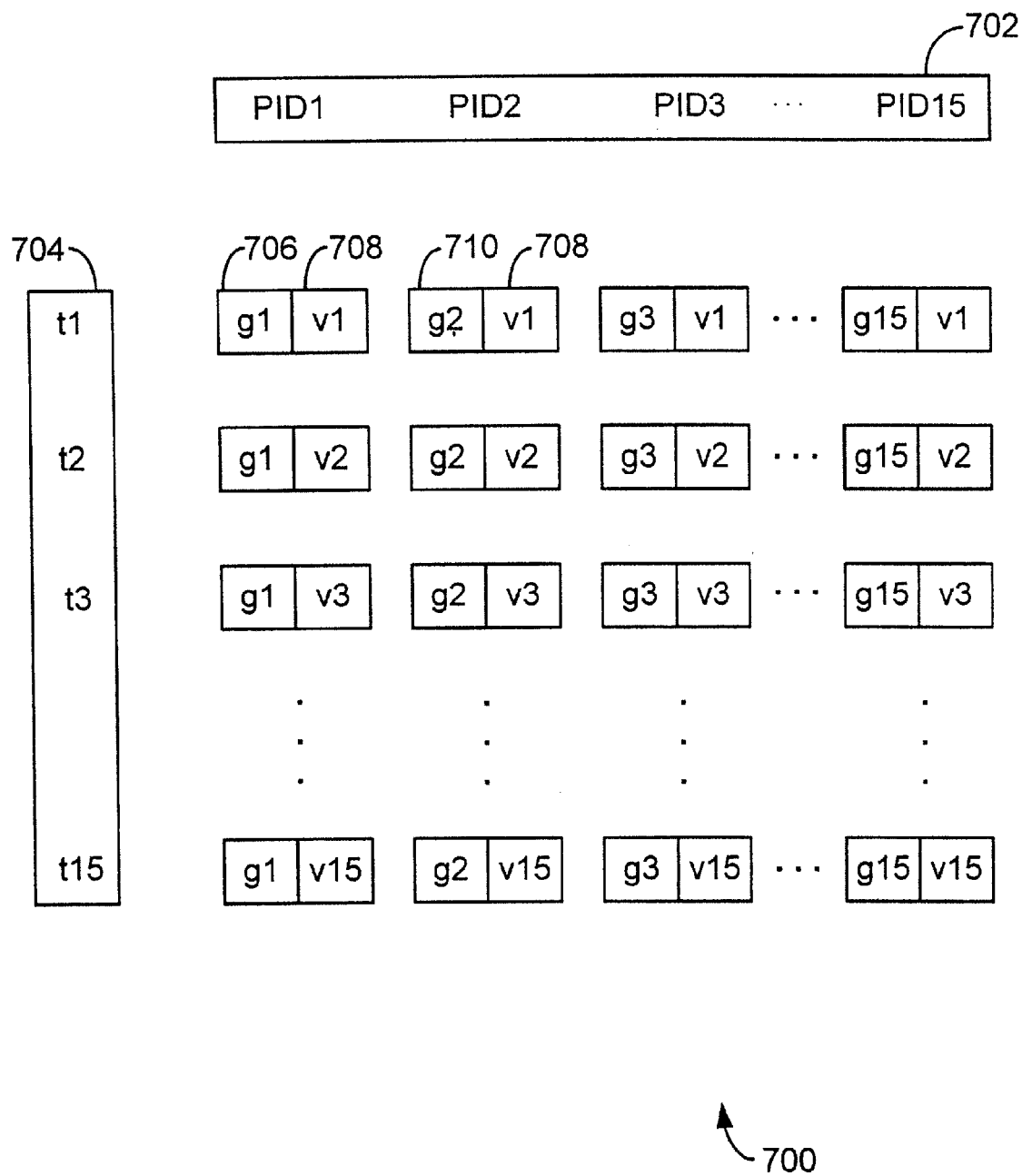
FIG. 7 depicts a PID map for a set of IPG pages encoded by the invention.

FIG. 7 depicts a graphical representation of PID assignment to each IPG page. The graph 700 contains a PID axis 702 and a time axis 704. At time 1 (t1) and, more than likely, within a single transport stream, the graphics 706 for a first IPG page and the video 708 for a first IPG page are sent in PID1. Then, in PID2, the graphics 710 for a second IPG page and the video 708 for the second IPG page are sent. Note that the video is the same in each IPG page that is sent at time 1 and only the graphics (g1, g2 . . . g5) change from IPG page to IPG page. The change in graphics may represent either different time intervals or different channel groupings shown in the IPG pages. In time 2, the grouping and encoding is repeated using different video. The process is repeated until all the IPG pages are generated to cover all available channels over a 24 hour period. The transport streams carrying the encoded IPG pages are then broadcast to all viewers.

An exemplary transport stream consists of N programs multiplexed together into one transport stream. Each program has it's own video PID, which contains all the MPEG bits for a single guide page. All the programs share the same audio and PCR.

To change pages in the guide, it is required to switch between programs (video PIDs) in a seamless manner. This cannot be done cleanly using a standard channel change by the STT switching from PID to PID directly, because such an operation flushes the video and audio buffers and typically gives half a second blank screen.

To have seamless decoder switching, a splice countdown (or random access indicator) method is employed at the end of each video sequence to indicate the point at which the video should be switched from one PID to another.

Using the same profile and constant bit rate coding for each encoding unit, the generated streams for different IPG pages are formed in a similar length compared to each other. This is due to the fact that the source material is almost identical differing only in the characters in the guide from one page to another. In this way, while streams are generated in close lengths, they are not exactly the same lengths, For example, for any given sequence of 15 video frames, the number of transport packets in the sequence varies from one guide page to another. Thus a finer adjustment is required to synchronize the beginnings and ends of each sequence across all guide pages in order for the countdown switching to work.

The invention provides the act of synchronization of a plurality of streams that provides seamless switching at the STT.

Three methods are provided for that purpose:

First, for each sequence you can count the longest guide page for that particular sequence, and then add sufficient null packets to the end of each other guide page so that all the guide pages become the same lengths. Then add the switching packets at the end of the sequence, after all the null packets.

The second method requires buffering of all the packets for all guide pages for each sequence. If this is allowed in the considered system, then the packets can be ordered in the transport stream such that the packets for each guide page appear at slightly higher or lower frequencies, so that they all finish at the same point. Then the switching packets are added at the end of each stream without the null padding.

A third method is to start each sequence together, and then wait until all the packets for all the guide pages have been generated. Once the generation of all packets is completed, switching packets are placed in the streams at the same time and point in each stream.

Depending on the implementation of STT decoder units and requirements of the considered application, each one of the methods can be applied with advantages. For example, the first method, which is null-padding, can be applied to avoid bursts of N packets of the same PID into a decoder's video buffer faster than the MPEG specified rate (e.g., 1.5 Mbit).

The same principles of splicing and synchronization techniques are applicable to a plurality of different transport stream forms, including recombinant stream.

The teachings of the above three methods can be extended apply to similar synchronization problems and to derive similar methods.

Returning to FIG. 1, the transport stream is coupled to a digital video modulator 126 where it is modulated onto a carrier that is appropriate for transmission through the distribution network 104. For a hybrid fiber coax based distribution network 104, the modulation is quadrature amplitude modulation (QAM).

The subscriber equipment 106 is connected to the network 104 and receives the transport stream from the network 104. A demodulator/decoder 124 in each of the terminals extracts the transport stream from the modulation, demultiplexes the bitstreams within the transport stream, and decodes a selected program guide video sequence. Since the program guide bitstreams are contained in the transport stream, the terminal selects a particular program guide using its unique packet identifier (PID) that causes a video demodulator/decoder 124 to decode the program guide bitstream identified by that PID (or PIDs in the case of slice based encoding). When the user selects another program guide, another stream is decoded based upon the newly selected PID or PIDs. By transmitting many program guide streams in a common transport stream and by frame locking the program guide source, encoding and decoding processes, the latency experienced as a subscriber selects one guide page after another is undetectable. Also, because the informational video is the same and frame synchronized in each program guide bitstream with the only difference being a different guide graphic, the subscriber sees a transition in the guide graphic, but the informational audio and video is seamlessly presented to the viewer.

FIG. 3 depicts a detailed block diagram of the compositor unit 200. The compositor unit 200 contains a plurality of serial-to-parallel converter modules 300 and 304, a plurality of image compositors 302, 306, and 308, an optional parallel-to-serial converter module 310 and a PCI bus 312. The informational video signals vs2, vs3, vs4 are assumed to be supplied as a conventional pixilated video signal in a 601 format (digital video) having each frame of 601 video synchronized with the frames of the other advertisement video signals. Generally, 601 video is supplied as a serial bitstream that is converted into parallel stream, i.e., one complete video frame is coupled to the compositor at a time.

More specifically, the background imagery vs1 and the first informational video vs2 are coupled to the serial-to-parallel converter module 300. The frames of each of these video signals are then coupled to the compositor 302. In operation, the compositor 302 synchronizes the frames, resizes the informational video to fit into a predefined rectangular region, positions the rectangular region on the background and merges the two video frame sequences. The controller 114 of FIG. 1 uses the PCI bus 312 to instruct the compositor as to the size of the informational video region and its position on the background. A commercially available compositor is used to perform the foregoing operations using 601 video signals.

The composited video sequence containing the background and first informational video is then coupled to the second compositor 306 such that the second informational video is composited onto the background and first video. The third compositor 308 performs a similar function to produce a frame sequence having the background and three informational video sequences composited into a single sequence. The size and position of the informational video display regions is controlled by signals from the controller via the PCI bus 312. The output sequence from the third compositor 308 is optionally coupled to the parallel-to-serial converter module 310 to produce a serial bitstream. Generally, the parallel data is coupled directly to the IPG grid compositors (202 in FIG. 2); however, if the compositor unit 200 is not physically near the compositors 202, then the parallel-to-serial converter 310 may be used to improve the integrity of the data as it is communicated over a distance. Although only three informational videos were added to the background using three compositors, clearly more compositors can be used if additional informational video sequences are desired.

FIG. 4 depicts a block diagram of one of the IPG grid compositors 202, e.g., compositor $202_1$. The compositor $202_1$ contains an alpha framestore 400, a video framestore 402 and a compositor 406. The alpha framestore 402 stores a bitmap array of weighting functions that control the degree of transparency that the IPG grid will have with respect to the background/informational frame sequence, i.e., the bitmap contains a value of transparency for each and every pixel in the IPG graphic. As such, the alpha framestore information controls the amount of background/advertising video scene that can be viewed "through" the IPG graphic. The video frame store 402 buffers the IPG graphic on a frame-by-frame basis to ensure alignment with the background/informational video frames. The compositor 406 combines the IPG graphic with the background/informational frames produced by the compositor unit 200 in FIG. 2. The position and size of the IPG graphic with respect to the background is controlled, via the control signal coupled to the compositor 406, by the controller 114 of FIG. 1.

Each of the IPG graphics, e.g., fifteen, are separately composited in this manner with the background and the advertising. As such, fifteen separate bitstreams, one contains each IPG graphic, are encoded and arranged in the transport stream.

FIG. 5A depicts a first illustrative IPG page layout $500_1$ as decoded by the decoder of the subscriber equipment. The page $500_1$ is one of the fifteen available screens (collectively referred to as IPG pages 500) that can be decoded by appropriate selection of a screen PID within a transport stream. Similar IPG screens can be also decoded from other transport streams that are broadcast to the subscriber equipment from the head end equipment. As decoded, the informational video in regions 504, 506 and 508 plays as any decoded video streams. The audio signal associated with one of the informational video sequences also is decoded and plays in conjunction with the video (i.e., audio follows video). The first IPG graphic 510 contains, for example, program information concerning channels 1 through 10. The subscriber, by manipulating an input device, can scroll through the program selections. As the scrolling function transitions from one cell to another, the cell is highlighted by a change in the on-screen display graphics. These graphics are sent to the subscriber equipment as "user data" and/or "private data" within the transport stream. A detailed description of the operation of the IPG 500 is presented in commonly assigned U.S. patent application Ser. No. 09/359,560 filed Jul. 22, 1999 and herein incorporated by reference.

When the subscriber reaches the bottom of the IPG graphic, i.e., the last cell or a special icon (arrow), a different PID is selected for decoding, i.e., the PID for the next IPG page containing channels 11 through 20. The decoder begins decoding the next stream as soon as it is selected. The connection between IPG pages is a functional attribute that is generally transmitted to the subscriber equipment as user data within the transport stream. Since the background and the informational video were synchronously added to the video sequence that become the IPG pages, the informational video seamlessly transitions from one screen to another without any visible anomalies. The IPG graphic is the only portion that changes from $510_1$ to $510_2$. The process of transitioning from one IPG page to another can be accomplished by incrementing or decrementing through the IPG pages. Additionally, parallel pages may be available to display additional time slots. As such, IPG pages representing programming in other time periods could be accessed by, for example, left and right arrows. These parallel pages may be carried in additional transport streams or in the same transport stream.

A second illustrative IPG page layout 600 is shown in FIG. 6. This IPG page layout is encoded in the exact same manner as the layout 500 of FIGS. 5A–5C. The IPG of FIG. 6 operates in a similar manner to that of IPG layout 500. The layout 600 is divided vertically such that the informational video, e.g., a video barker, appears on the right half of the layout and the guide region appears on the left. The guide graphics, graphical icons, background imagery, and informational video are combined and then encoded in the same manner as discussed above. A detailed description of the IPG 600 is presented in commonly assigned U.S. patent application Ser. No. 09/359,560 filed Jul. 22, 1999 and herein incorporated by reference.

Figure 8:
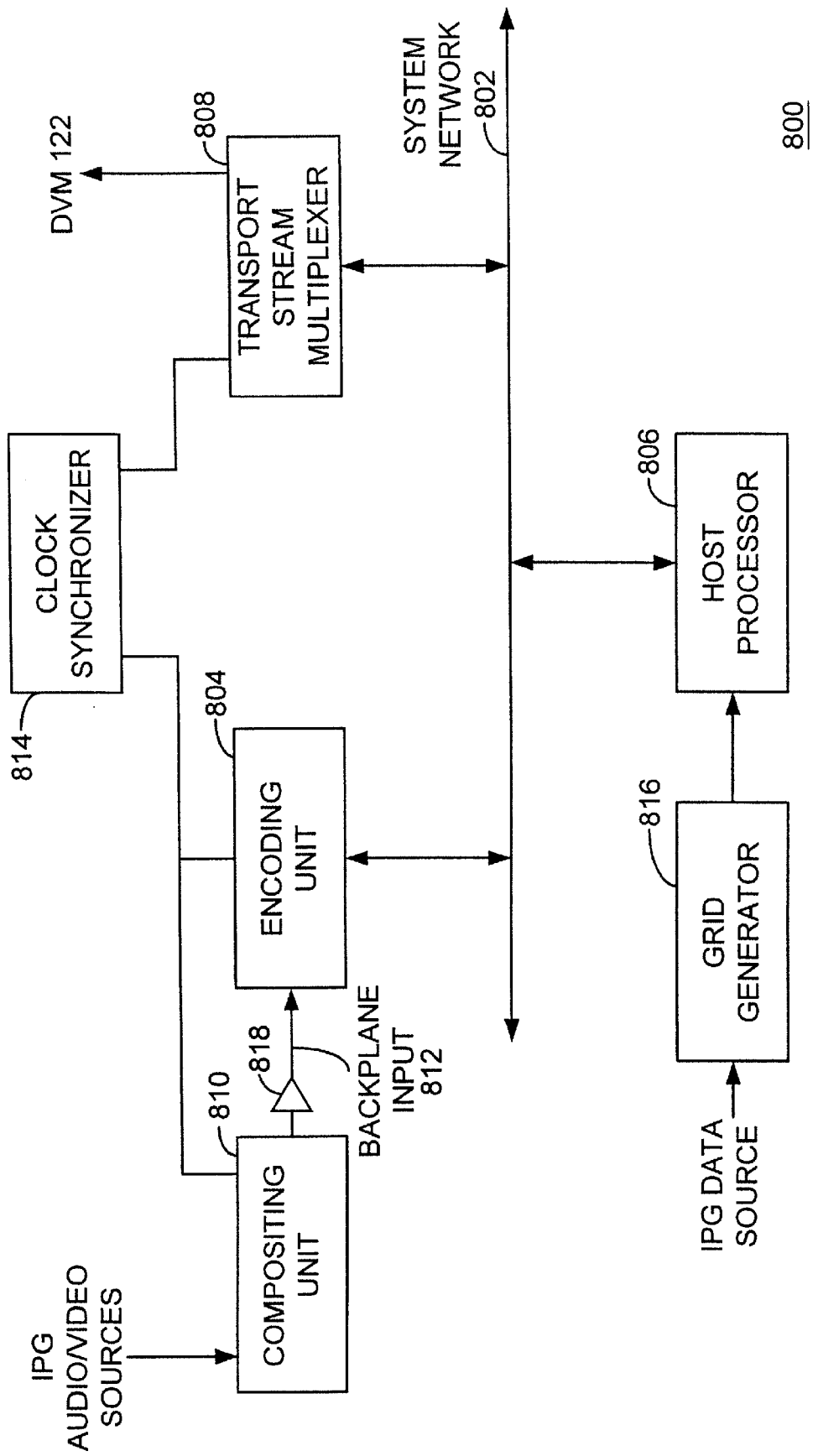
FIG. 8 is a schematic diagram depicting an interactive program guide (IPG) encoding apparatus (800) in accordance with an embodiment of the present invention.

FIG. 8 is a schematic diagram depicting an interactive program guide (IPG) encoding apparatus (800) in accordance with an embodiment of the present invention. The apparatus (800) includes a system network (802), an encoding unit (804), a host processor (806), a transport stream multiplexer (808), a compositing unit(810), a backplane or other synchronized input (812) from the compositing unit (810) to the encoding unit (804), a clock synchronizer (814), and a grid generator (816).

The system network (802) is coupled to the encoding unit (804), the host processor (806), and the transport stream multiplexer (808). The system network (802) comprises, for example, a high-speed ethernet network.

The compositing unit (810) receives its input from IPG audio/video sources. The compositing unit (810), for example, comprises the functionality of the compositor unit (200)in FIG. 2. The grid generator (816) receives its input from an IPG data source. The grid generator (816) comprises, for example, the functionality of IPG grid generator (120) in FIG. 2. The grid generator (816) is adapted to generate the plurality of grid signals from the IPG data signal, where each of the plurality of grid signals includes programming information for one of the pages of the IPG. The encoding unit (804) comprises, for example, the functionality of the plurality of IPG grid compositors (202), the plurality of MPEG-2 real-time video encoders (204), and Dolby AC-3 real-time audio encoder (210) in FIG. 2. The encoding unit (804) is coupled to receive the common background signal from the compositing unit (810) by way of the backplane input (812) and to receive the plurality of grid signals from the system network (802) by way of the host processor (806). Alternatively, the encoding unit (804) may be coupled to receive the common background signal from the compositing unit (810) by way of a distribution amplifier (818) or other synchronized input means. A distribution amplifier (818) would basically receive as a single input the common background signal and transmit as output multiple synchronized versions of the same signal.

The encoding unit (804) functions to generate a plurality of non-common composite signals by combining each of a plurality of grid signals with the common background signal. As a result of the delivery of the common background signal being synchronized, the common background signal appears continuous when the subscriber equipment (106) switches viewing between the non-common composite signals. The encoding unit (804) also functions to generate a plurality of non-common encoded signals by encoding the plurality of non-common composite signals.

The transport stream multiplexer (808) is coupled to transmit a transport stream to the DVM (122). The transport stream multiplexer (808) comprises, for example, the functionality of the real-time transport stream multiplexer (206) in FIG. 2. The multiplexer (808) is adapted to generate the transport stream by multiplexing the plurality of non-common encoded signals received from the encoding unit (804).

The clock synchronizer (814) is coupled to the compositing unit (810), the encoding unit (804), and the transport stream multiplexer (808). The clock synchronizer (814) comprises, for example, the functionality of the encoding profile and clock generator (250) in FIG. 2. For example, the clock synchronizer (814) may send a 27 MHz clock to the transport stream multiplexer (808) so that the multiplexer (808) may synchronize the transport stream output to that clock.

The host processor (806) is coupled to receive input from the grid generator (816). The host processor (806) includes software which processes grid data from the grid generator (816) and coordinates the movement of files between the components (encoding unit 804, host processor 806, and transport stream multiplexer 808) which are interconnected via the system network (802).

The IPG encoding apparatus (800) is preferably designed to take a least amount of room in a headend of a cable distribution network when the distribution network (104) comprises such a cable distribution network. For example, a one implementation of the apparatus (800) would use a first standard 19 inch rack unit to contain the compositing unit (810), a second standard 19 inch rack unit to contain the host processor (806); a third standard 19 inch rack unit to contain the grid generator (816); and a fourth standard 19 inch rack unit to contain the encoding unit (804), transport stream multiplexer (808) and the clock synchronizer (814). Another implementation of the system (800) would combine the functionalities of the compositing unit (810), the encoding unit (804), the host processor (806), the transport stream multiplexer (808), the clock synchronizer (814), and the grid generator (816) into a single standard 19 inch rack unit.

Alternatively, instead of the IPG encoding apparatus (800) being placed along with service provider equipment in the headend, the apparatus (800) may be located at a central source coupled to a plurality of headends of a cable distribution network.

Although the foregoing description illustratively disclosed encoding an IPG page, the invention finds use in encoding any form of mixed graphical and video information screens. For example, the invention can be used to encode an HTML web page in the graphics region and a related television program in the video region. Alternatively, the informational video can be a television program that is displayed within a program guide while a viewer reviews the schedule information. Selecting the video region would enlarge the video to the entire screen, while selecting a program title in the program guide may initiate a preview video to play in second video window. As such, the invention should be interpreted as encompassing any combination of video and graphics that is encoded as a digital bit stream and broadcast from a head end of an information distribution system.

Although various embodiments which incorporate the teachings of the present invention have been shown and described in detail herein, those skilled in the art can readily devise many other varied embodiments that still incorporate these teachings.

What is claimed is:

1. A system for providing an interactive program guide (IPG) via a distribution network and subscriber equipment, the system comprising:
   an IPG encoding apparatus, the IPG encoding apparatus being adapted to generate a transport stream, where the transport stream includes a plurality of non-common encoded signals which represent a plurality of pages of the IPG, wherein the IPG encoding apparatus comprises:
      a common compositor adapted to generate a common background signal from an IPG audio signal and at least one IPG video signal;
      a grid generator adapted to generate a plurality of grid signals from an IPG data signal, where each of the plurality of grid signals includes programming information for one of the pages of the IPG;
      a non-common compositor adapted to generate said plurality of non-common composite signals by combining each of the plurality of grid signals with the common background signal;
      a plurality of encoders adapted to generate the plurality of non-common encoded signals from the plurality of non-common composite signals; and
      a multiplexer adapted to generate the transport stream by multiplexing the plurality of non-common encoded signals; and
   service provider equipment (SPE) adapted to be coupled to the distribution network, the SPE including a digital video modulator adapted to generate a modulated signal by modulating a carrier signal with the transport stream and to transmit the modulated signal to the subscriber equipment by via the distribution network.

2. The system of claim 1, wherein the IPG encoding apparatus and the SPE are within a headend of the distribution network.

3. The system of claim 2, wherein the IPG encoding apparatus is implemented in 5 or less standard rack units within the headend.

4. The system of claim 2, where the IPG encoding apparatus is implemented in one standard rack unit within the headend.

5. The system of claim 1, wherein the IPG encoding apparatus is at a central source coupled to a plurality of headends of the distribution network.

6. The system of claim 1, wherein the IPG encoding apparatus further comprises:
   a synchronizing mechanism adapted to synchronize delivery of the common background signal to a plurality of non-common compositing devices within the non-common compositor.

7. The system of claim 6, wherein as a result of the delivery of the common background signal being synchronized, the common background signal appears continuous when the subscriber equipment switches viewing between the non-common composite signals.

8. The system of claim 6, wherein common background signal is delivered to non-common compositors via a backplane bus.

9. The backplane bus of claim 8, wherein a one common signal can be coupled to a plurality of encoders.

10. The system of claim 6, wherein the synchronizing mechanism comprises a distribution amplifier having an input adapted to receive the common background signal from the common compositor and a plurality of outputs adapted to transmit the common background signal to the plurality of non-common compositors.

11. An apparatus for generating a transport stream which includes a plurality of non-common encoded signals representing a plurality of pages of an interactive program guide (IPG), the apparatus comprising:
   a common compositor adapted to generate a common background signal from an IPG audio signal and at least one IPG video signal;
   a grid generator adapted to generate a plurality of grid signals from an IPG data signal, where each of the plurality of grid signals includes programming information for one of the pages of the IPG;
   a non-common compositor adapted to generate a plurality of non-common composite signals by combining each of the plurality of grid signals with the common background signal;
   a plurality of encoders adapted to generate the plurality of non-common encoded signals from the plurality of non-common composite signals; and
   a multiplexer adapted to generate the transport stream by multiplexing the plurality of non-common encoded signals.

12. The apparatus of claim 11, the apparatus further comprising:
   a synchronizing mechanism adapted to synchronize delivery of the common background signal to a plurality of non-common compositing devices within the non-common compositor.

13. The apparatus of claim 12, wherein as a result of the delivery of the common background signal being synchronized, the common background signal appears continuous when switching viewing between the non-common composite signals.

14. The apparatus of claim 12, wherein common background signal is delivered to non-common compositors via a backplane bus.

15. The backplane bus of claim 14, wherein a one common signal can be coupled to a plurality of encoders.

16. The apparatus of claim 12, wherein the synchronizing mechanism comprises a distribution amplifier having an input adapted to receive the common background signal from the common compositor and a plurality of outputs adapted to transmit the common background signal to the plurality of non-common compositors.

* * * * *

UNITED STATES PATENT AND TRADEMARK OFFICE
CERTIFICATE OF CORRECTION

PATENT NO. : 6,732,370 B1
DATED : May 4, 2004
INVENTOR(S) : Gordon et al.

It is certified that error appears in the above-identified patent and that said Letters Patent is hereby corrected as shown below:

Title page,
Item [57], ABSTRACT,
Line 19, add -- the references called to the attention of the PTO by Applicants and considered by the Examiner per the attached Information Disclosure Statements by Applicant (6 pages); --

Column 1,
Line 13, change "Encording" to -- Encoding --.

Column 4,
Line 28, change "decoder" to -- demodulator/decoder --.

Column 5,
Line 67, change "equiament" to -- equipment --; change "demodulador/" to -- demodulator/ --.
Line 68, change "e,g.," to -- e.g., --.

Column 6,
Line 1, change "demoludator" to -- demodulator/decoder --.
Line 4, change "indefined" to -- identified --.
Line 6, change "demoludator" to -- demodulator/decoder --.
Line 16, change "seemless" to -- seamless --.
Line 20, change "seeamlessly" to -- seamlessly --.
Line 42, change "background/advertisement" to -- informational/advertisement --.

Column 7,
Line 2, change "dock" to -- clock --.
Line 33, change (E1, E2, E3,…, E15) to -- (E1, E2, E3, , E15) --.

UNITED STATES PATENT AND TRADEMARK OFFICE
CERTIFICATE OF CORRECTION

PATENT NO. : 6,732,370 B1
DATED : May 4, 2004
INVENTOR(S) : Gordon et al.

It is certified that error appears in the above-identified patent and that said Letters Patent is hereby corrected as shown below:

<u>Column 8,</u>
Line 15, change "g5" to -- g15 --.
Line 45, change "lengths," to -- lengths. --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,732,370 B1  
DATED        : May 4, 2004  
INVENTOR(S)  : Gordon et al.

It is certified that error appears in the above-identified patent and that said Letters Patent is hereby corrected as shown below:

Title page,
Item [56], References Cited, U.S. PATENT DOCUMENTS, add the references per the attached Information Disclosure Statements

| 5,517,267 | A | Dunn et al. | 05/14/1996 |
|---|---|---|---|
| 5,995,095 | A | Ratakonda | 11/30/1999 |
| 5,999,173 | A | Ubillos | 12/7/1999 |
| 6,104,391 | A | Johnston, Jr. et al. | 08/15/2000 |
| 6,151,059 | A | Schein et al. | 11/21/2000 |
| 6,167,188 | A | Young et al. | 12/26/2000 |

| | | | | |
|---|---|---|---|---|
| 4,290,063 | 09/15/1981 | Traster | 340 | 723 |
| 4,437,093 | 03/13/1984 | Bradley | 340 | 726 |
| 4,496,976 | 01/29/1985 | Swanson et al. | 358 | 147 |
| 4,520,356 | 05/28/1985 | O'Keefe et al. | 340 | 750 |
| 4,600,921 | 07/15/1986 | Thomas | 340 | 825.31 |
| 4,633,297 | 12/30/1986 | Skerlos et al. | 358 | 22 |
| 4,706,121 | 11/10/1987 | Young | 358 | 142 |
| 4,712,239 | 12/08/1987 | Frezza et al. | 380 | 20 |
| 4,734,764 | 03/29/1988 | Pocock et al. | 358 | 86 |
| 4,739,318 | 04/19/1988 | Cohen | 340 | 750 |
| 4,742,344 | 05/03/1988 | Nakagawa et al. | 340 | 723 |
| 4,745,468 | 05/17/1988 | Von Kohorn | 358 | 84 |
| 4,751,578 | 06/14/1988 | Reiter et al. | 358 | 183 |
| 4,792,848 | 12/20/1988 | Nussrallah et al. | 358 | 86 |
| 4,792,849 | 12/20/1988 | McCalley et al. | 358 | 86 |
| 4,829,372 | 05/09/1989 | McCalley et al. | 358 | 86 |
| 4,829,569 | 05/09/1989 | Seth-Smith et al. | 380 | 10 |
| 4,847,825 | 07/11/1989 | Levine | 369 | 47 |
| 4,860,123 | 08/22/1989 | McCalley et al. | 358 | 342 |
| 4,866,770 | 09/12/1989 | Seth-Smith et al. | 380 | 20 |
| 4,876,592 | 10/24/1989 | Von Kohorn | 358 | 84 |
| 4,885,775 | 12/05/1989 | Lucas | 380 | 10 |
| 4,890,321 | 12/26/1989 | Seth-Smith et al. | 380 | 20 |
| 4,905,094 | 02/27/1990 | Pocock et al. | 358 | 342 |
| 4,908,713 | 03/13/1990 | Levine | 358 | 335 |
| 4,926,255 | 05/15/1990 | Von Kohorn | 358 | 84 |
| 4,941,040 | 07/10/1990 | Pocock et al. | 358 | 86 |
| 4,963,994 | 10/16/1990 | Levine | 358 | 335 |
| 4,977,455 | 12/11/1990 | Young | 358 | 142 |
| 4,991,011 | 02/05/1991 | Johnson et al. | 358 | 141 |
| 4,994,908 | 02/19/1991 | Kuban et al. | 358 | 86 |
| 5,014,125 | 05/07/1991 | Pocock et al. | 358 | 86 |
| 5,034,807 | 07/23/1991 | Von Kohorn | 358 | 84 |
| 5,038,211 | 08/06/1991 | Hallenbeck | 358 | 142 |
| 5,057,915 | 10/15/1991 | Von Kohorn | 358 | 84 |
| 5,058,160 | 10/15/1991 | Banker et al. | 380 | 20 |

Page 1 of 5

UNITED STATES PATENT AND TRADEMARK OFFICE
CERTIFICATE OF CORRECTION

PATENT NO. : 6,732,370 B1  
DATED : May 4, 2004  
INVENTOR(S) : Gordon et al.

Page 2 of 5

It is certified that error appears in the above-identified patent and that said Letters Patent is hereby corrected as shown below:

Title page (cont'd),

| | | | | |
|---|---|---|---|---|
| 5,109,279 | 04/28/1992 | Ando | 358 | 147 |
| 5,113,496 | 05/12/1992 | McCalley et al. | 395 | 200 |
| 5,119,188 | 06/02/1992 | McCalley et al. | 358 | 86 |
| 5,123,046 | 06/16/1992 | Levine | 380 | 10 |
| 5,128,752 | 07/07/1992 | Von Kohorn | 358 | 84 |
| 5,146,210 | 09/08/1992 | Heberle | 340 | 709 |
| 5,151,789 | 09/29/1992 | Young | 358 | 194.1 |
| 5,191,410 | 03/02/1993 | McCalley et al. | 358 | 86 |
| 5,195,092 | 03/16/1993 | Wilson et al. | 370 | 94.2 |
| 5,208,665 | 05/04/1993 | McCalley et al. | 358 | 86 |
| 5,227,874 | 07/13/1993 | Von Kohorn | 358 | 84 |
| 5,231,665 | 07/27/1993 | Auld et al. | 380 | 20 |
| 5,239,540 | 08/24/1993 | Rovira et al. | 370 | 77 |
| 5,247,364 | 09/21/1993 | Banker et al. | 358 | 191.1 |
| 5,249,044 | 09/28/1993 | Von Kohorn | 358 | 86 |
| 5,260,778 | 11/09/1993 | Kauffman et al. | 358 | 86 |
| 5,270,809 | 12/14/1993 | Gammie et al. | 358 | 84 |
| 5,283,734 | 02/01/1994 | Von Kohorn | 364 | 412 |
| 5,293,357 | 03/08/1994 | Hallenbeck | 348 | 734 |
| 5,297,204 | 03/22/1994 | Levine | 380 | 10 |
| 5,301,028 | 04/05/1994 | Banker et al. | 348 | 570 |
| 5,303,295 | 04/12/1994 | West et al. | 380 | 10 |
| 5,307,173 | 04/26/1994 | Yuen et al. | 358 | 335 |
| 5,319,454 | 06/07/1994 | Schutte | 348 | 5.5 |
| 5,319,707 | 06/07/1994 | Wasilewski et al. | 380 | 14 |
| 5,335,079 | 08/02/1994 | Yuen et al. | 358 | 335 |
| 5,353,121 | 10/04/1994 | Young et al. | 348 | 563 |
| 5,365,282 | 11/15/1994 | Levine | 348 | 734 |
| 5,373,330 | 12/13/1994 | Levine | 348 | 734 |
| 5,382,983 | 01/17/1995 | Kwoh et al. | 348 | 716 |
| 5,400,401 | 03/21/1995 | Wasilewski et al. | 380 | 9 |
| 5,406,558 | 04/11/1995 | Rovira et al. | 370 | 77 |
| 5,414,448 | 05/09/1995 | Wada et al. | 345 | 194 |
| 5,414,756 | 05/09/1995 | Levine | 379 | 67 |
| 5,420,647 | 05/30/1995 | Levine | 348 | 734 |
| 5,422,674 | 06/06/1995 | Hooper et al. | 348 | 409 |
| 5,428,404 | 06/27/1995 | Ingram et al. | 348 | 726 |
| 5,438,370 | 08/01/1995 | Primiano et al. | 348 | 476 |

UNITED STATES PATENT AND TRADEMARK OFFICE
CERTIFICATE OF CORRECTION

PATENT NO. : 6,732,370 B1
DATED : May 4, 2004
INVENTOR(S) : Gordon et al.

It is certified that error appears in the above-identified patent and that said Letters Patent is hereby corrected as shown below:

Title page (cont'd),

| | | | | |
|---|---|---|---|---|
| 5,440,632 | 08/08/1995 | Bacon et al. | 380 | 20 |
| 5,473,609 | 12/05/1995 | Chaney | 370 | 94.1 |
| 5,473,704 | 12/05/1995 | Abe | 382 | 235 |
| 5,475,382 | 12/12/1995 | Yuen et al. | 340 | 825.72 |
| 5,477,262 | 12/19/1995 | Banker et al. | 348 | 7 |
| 5,479,266 | 12/26/1995 | Young et al. | 358 | 335 |
| 5,479,268 | 12/26/1995 | Young et al. | 358 | 335 |
| 5,485,221 | 01/16/1996 | Banker et al. | 348 | 563 |
| 5,488,409 | 01/30/1996 | Yuen et al. | 348 | 5 |
| 5,493,339 | 02/20/1996 | Birch et al. | 348 | 461 |
| 5,502,504 | 03/26/1996 | Marshall et al. | 348 | 565 |
| 5,508,815 | 04/16/1996 | Levine | 358 | 335 |
| 5,515,173 | 05/07/1996 | Mankovitz et al. | 358 | 335 |
| 5,523,794 | 06/04/1996 | Mankovitz et al. | 348 | 460 |
| 5,523,796 | 06/04/1996 | Marshall et al. | 348 | 589 |
| 5,532,732 | 07/02/1996 | Yuen et al. | 348 | 1 |
| 5,532,754 | 07/02/1996 | Young et al. | 348 | 569 |
| 5,539,391 | 07/23/1996 | Yuen | 340 | 825.72 |
| 5,539,822 | 07/23/1996 | Lett | 380 | 20 |
| 5,543,852 | 08/06/1996 | Yuen et al. | 348 | 478 |
| 5,550,576 | 08/27/1996 | Klosterman | 348 | 6 |
| 5,552,837 | 09/03/1996 | Mankovitz | 348 | 734 |
| 5,553,123 | 09/03/1996 | Chan et al. | 379 | 102 |
| 5,559,550 | 09/24/1996 | Mankovitz | 348 | 6 |
| 5,559,870 | 09/24/1996 | Patton et al. | 379 | 107 |
| 5,568,272 | 10/22/1996 | Levine | 386 | 48 |
| 5,579,055 | 11/26/1996 | Hamilton et al. | 348 | 476 |
| 5,579,057 | 11/26/1996 | Banker et al. | 348 | 589 |
| 5,581,614 | 12/03/1996 | Ng et al. | 380 | 20 |
| 5,592,551 | 01/07/1997 | Lett et al. | 380 | 20 |
| 5,600,378 | 02/04/1997 | Wasilewski et al. | 348 | 468 |
| 5,600,711 | 02/04/1997 | Yuen | 379 | 102 |
| 5,604,528 | 02/18/1997 | Edwards et al. | 348 | 5.5 |
| 5,619,247 | 04/08/1997 | Russo | 348 | 3 |
| 5,619,274 | 04/08/1997 | Roop et al. | 348 | 461 |
| 5,619,383 | 04/08/1997 | Ngai | 360 | 20 |
| 5,621,579 | 04/15/1997 | Yuen | 386 | 121 |
| 5,630,119 | 05/13/1997 | Aristides et al. | 395 | 601 |

UNITED STATES PATENT AND TRADEMARK OFFICE
CERTIFICATE OF CORRECTION

PATENT NO. : 6,732,370 B1  
DATED : May 4, 2004  
INVENTOR(S) : Gordon et al.

Page 4 of 5

It is certified that error appears in the above-identified patent and that said Letters Patent is hereby corrected as shown below:

Title page (cont'd),

| | | | | |
|---|---|---|---|---|
| 5,644,354 | 07/01/1997 | Thompson et al. | 348 | 13 |
| 5,659,367 | 08/19/1997 | Yuen | 348 | 465 |
| 5,673,089 | 06/10/1997 | Yuen et al. | 604 | 95 |
| 5,675,575 | 10/07/1997 | Wall, Jr. et al. | 370 | 326 |
| 5,684,525 | 11/04/1997 | Klosterman | 348 | 12 |
| 5,692,214 | 11/25/1997 | Levine | 395 | 833 |
| 5,701,383 | 12/23/1997 | Russo et al. | 386 | 46 |
| 5,710,601 | 01/20/1998 | Marshall et al. | 348 | 564 |
| 5,715,515 | 02/03/1998 | Akins, III et al. | 455 | 4.1 |
| 5,716,273 | 02/10/1998 | Yuen | 463 | 29 |
| 5,724,203 | 03/03/1998 | Kwoh et al. | 360 | 72.3 |
| 5,724,525 | 03/03/1998 | Beyers, II et al. | 395 | 240 |
| 5,727,060 | 03/10/1998 | Young | 380 | 10 |
| 5,731,844 | 03/24/1998 | Rauch et al. | 348 | 563 |
| 5,751,282 | 05/12/1998 | Girard et al. | 345 | 327 |
| 5,754,940 | 05/19/1998 | Smith et al. | 455 | 5.1 |
| 5,757,416 | 05/26/1998 | Birch et al. | 348 | 6 |
| 5,764,739 | 06/09/1998 | Patton et al. | 379 | 106.03 |
| 5,771,064 | 06/23/1998 | Lett | 348 | 10 |
| 5,790,198 | 08/04/1998 | Roop et al. | 348 | 460 |
| 5,790,806 | 08/04/1998 | Koperda | 395 | 200.82 |
| 5,801,753 | 09/01/1998 | Eyer | 348 | 13 |
| 5,801,787 | 09/01/1998 | Schein et al. | 348 | 569 |
| 5,805,204 | 09/08/1998 | Thompson et al. | 348 | 13 |
| 5,808,608 | 09/15/1998 | Young et al. | 345 | 327 |
| 5,809,204 | 09/15/1998 | Young et al. | 386 | 83 |
| 5,812,205 | 09/22/1998 | Milnes et al. | 348 | 460 |
| 5,828,420 | 10/27/1998 | Marshall et al. | 348 | 564 |
| 5,828,945 | 10/27/1998 | Klosterman | 455 | 4.2 |
| 5,844,620 | 12/01/1998 | Coleman | 348 | 461 |
| 5,850,218 | 12/15/1998 | Lajoie et al. | 345 | 327 |
| 5,852,478 | 12/22/1998 | Kwoh | 348 | 734 |
| 5,854,840 | 12/29/1998 | Cannella, Jr. | 380 | 9 |
| 5,870,150 | 02/09/1999 | Yuen | 348 | 553 |
| 5,870,474 | 02/09/1999 | Wasilewski et al. | 380 | 21 |
| 5,880,768 | 03/09/1999 | Lemmons | 348 | 1 |
| 5,915,068 | 06/22/1999 | Levine | 386 | 83 |
| 5,949,476 | 09/07/1999 | Pocock et al. | 348 | 24 |

UNITED STATES PATENT AND TRADEMARK OFFICE
CERTIFICATE OF CORRECTION

PATENT NO. : 6,732,370 B1
DATED : May 4, 2004
INVENTOR(S) : Gordon et al.

It is certified that error appears in the above-identified patent and that said Letters Patent is hereby corrected as shown below:

Title page (cont'd),

| B1 4,706,121 | 12/14/1993 | Young | 358 | 142 |
|---|---|---|---|---|
| Re 32,187 (4,213,124) | 06/17/1986 | Barda et al. | 340 | 706 |
| Re 35,954 (5,297,204) | 11/10/1998 | Levine | 380 | 10 |

Column 6,
Line 6, change "demodulador/decoder" to -- demodulator/decoder --

Signed and Sealed this

Twelfth Day of October, 2004

JON W. DUDAS
*Director of the United States Patent and Trademark Office*